Sept. 29, 1970     W. M. ROUNSVILLE     3,530,651
CRANBERRY HARVESTER
Filed Oct. 3, 1967
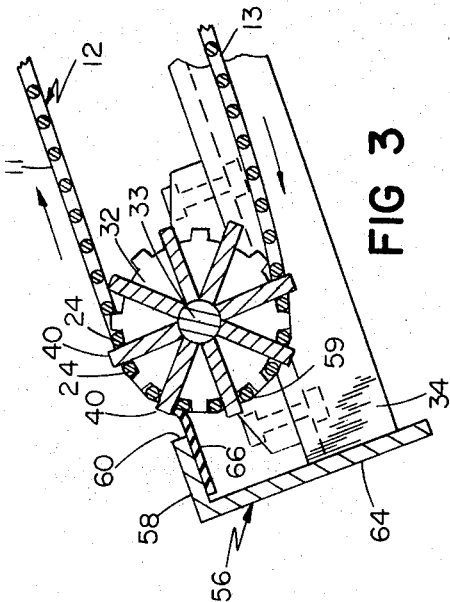
FIG 3
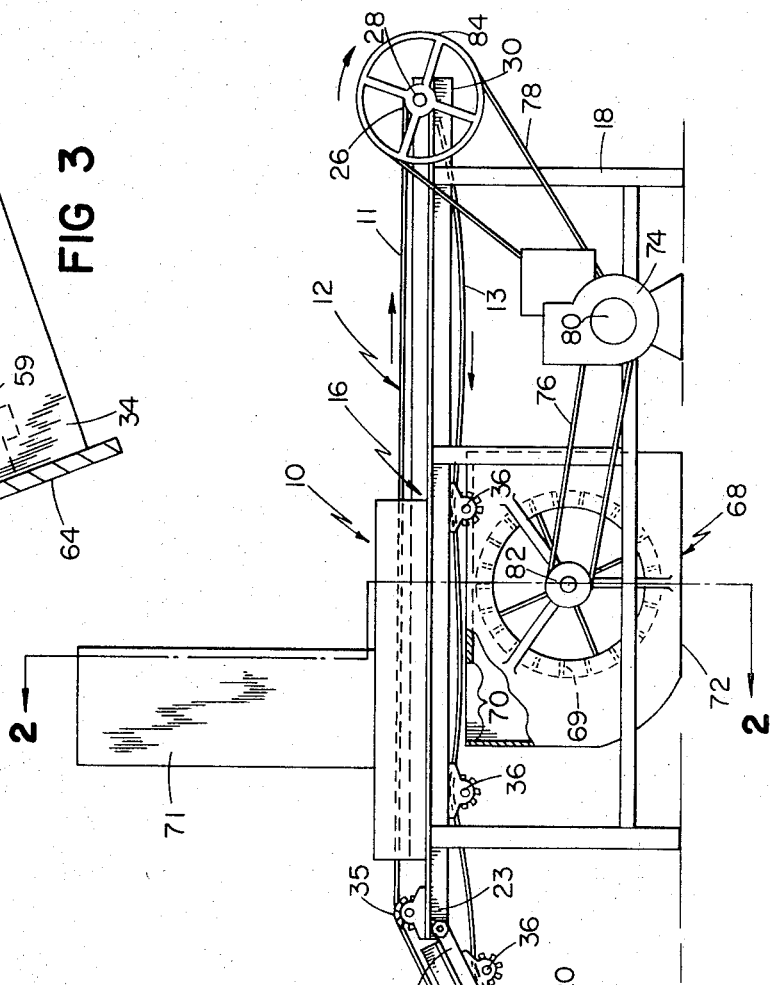
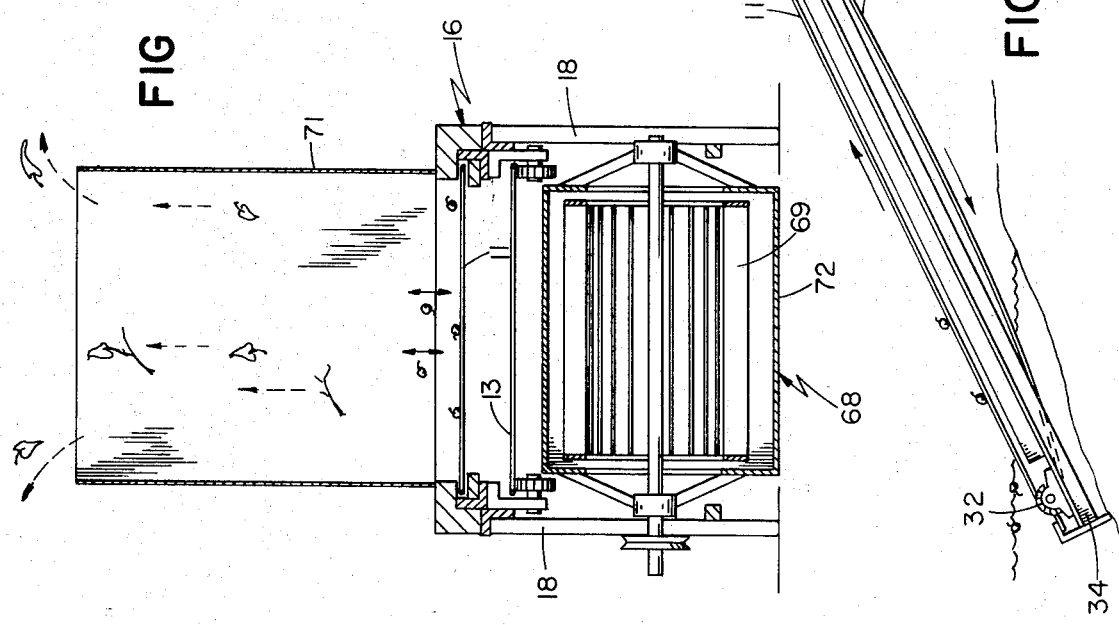
FIG 2
FIG 1

3,530,651
CRANBERRY HARVESTER
Walter Marland Rounsville, Box 255,
Nantucket, Mass. 02554
Filed Oct. 3, 1967, Ser. No. 672,496
Int. Cl. A01d 45/08
U.S. Cl. 56—9
9 Claims

ABSTRACT OF THE DISCLOSURE

A cranberry harvester including an inclined ramp, an endless open conveyor extending around and engaging a conveyor support at the lower end of the ramp, a motor for advancing the conveyor, a baffle mounted adjacent and extending transverse the ramp lower end with a first longitudinal edge adjacent the portion of the conveyor engaging the support and a second longitudinal edge below the ramp, a wiper secured to the baffle and engaging the conveyor, and a blower for producing an airstream of uneven intensity mounted below the conveyor in position for blowing upwardly through a portion of the conveyor.

---

This invention relates to harvesters and, more particularly, to conveyors for harvesting cranberries.

It is a primary object of the present invention to provide novel and improved apparatus for gathering cranberries from a flooded bog. Other objects include providing apparatus for removing the sticks and other trash from harvested cranberries and for drawing floating cranberries into a moving conveyor.

The invention accomplishes these and other objects by providing a cranberry harvester including an inclined ramp having a lower end adapted for submerging in a flooded cranberry bog, an endless open conveyor extending around and engaging conveyor supports at the ramp lower end, a motor for advancing the conveyor and causing water and berries to flow onto the conveyor upper run, and a baffle mounted adjacent the ramp lower end with a first longitudinal edge adjacent the portion of the conveyor engaging the support and a second longitudinal edge below the ramp. In preferred embodiments there is provided a wiper secured to the baffle and engaging the portion of the conveyor engaging the support and a blower for producing an airstream of uneven intensity mounted below the conveyor in position for blowing upwardly therethrough to remove the trash from the berry-trash mixture on the conveyor, the strongest portion of the airstream being nearest the ramp.

Other objects, features and advantages will appear from the following detailed description of a preferred embodiment of the invention, together with the attached drawings in which:

FIG. 1 is a plan view of a cranberry harvester constructed in accord with the present invention;

FIG. 2 is a sectional view of the harvester of FIG. 1, the section being taken along the line 2—2; and, FIG. 3 is a sectional view of a foot portion of the ramp of the harvester of FIG. 1.

Referring more particularly to the drawings, there is shown in FIGS. 1–3 a cranberry elevator and detrashing machine 10 comprising an endless open conveyor 12 supported on an open frame including a raised level upper frame 16 supported on depending legs 18 and a ramp 20 hingedly secured at one end 22 to an adjacent end 23 of upper frame 16.

As shown, conveyor 12 comprises an open, ladder-like grid of number nine wire, eighteen inches wide, with adjacent transverse wire rungs 24 at approximately half-inch intervals. The upper run 11 of conveyor 12 is supported on frame 16 and ramp 20 by a pair of drive sprockets 26 at the discharge end 30 (opposite ramp 20) of frame 16, a pair of intake sprockets 32 at the foot 34 of ramp 20, and a pair of intermediate support sprockets 35 at end 23 of frame 16. The lower run 13 of conveyor 12 is supported by three pairs of sprockets 36 provided on the undersides of frame 16 and ramp 20. Drive sprockets 26 and intake sprockets 32 are mounted on shafts 28 and 33, respectively. A plurality of vanes 40 are welded to shaft 33. Each vane 40 extends transversely the width of conveyor 12 and radially outwardly from shaft 33 to protrude approximately 5/16" through the space between adjacent rungs 24 of conveyor 12.

A baffle 56 comprising an angle iron having a length substantially greater than the width of ramp 20 is mounted adjacent the foot 34 and extending transversely of the ramp. One leg 58 of baffle 56 is mounted substantially parallel to in a plane slightly below the surface of the portion of upper run 11 of conveyor 12 supported on ramp 20. The longitudinal edge 60 of leg 58 is spaced slightly from and substantially parallel with the portion 59 of conveyor 12 engaging sprockets 32 and vanes 40. The other leg 64 of baffle 58 extends downwardly to a point slightly below the bottom of foot 34 of ramp 20.

A rubber wiper 66, substantially rectangular in cross section and having a length substantially equal to the width of conveyor 12, is secured to the underside of leg 58 with a longitudinal edge of wiper 66 engaging portion 59 of conveyor 12 and the outer edges of vanes 40.

A convention nine by thirteen inch squirrel cage blower 68 is provided below frame 16 within legs 18 with the outlet 70 of blower 68 facing upwardly toward conveyor 12. A rectangular stack 71 having a width substantially equal to the width of conveyor 12 is mounted on frame 16 above the portion of the conveyor upper run 11 overlying outlet 70. As shown, the lower segment of the normally accurate casing of blower 68 has been flattened to provide a substantially flat lower casing portion 72. The cross-sectional area of the air-flow chamber between the periphery of the rotatable central cage 69 of blower 68 and flat casing portion 72 is substantially less than the cross-sectional area of the portion of the air flow chamber between it and outlet 70.

A three horsepower gasoline motor 74 is provided for driving conveyor 12 and blower 68. As shown, a pair of V-belts 76, 78 extend from the drive shaft 80 of motor 74 to, respectively, a drive pulley 82 on blower 68 and a drive pulley 84 on one end of the shaft 28 mounting drive sprockets 26.

In operation, the foot 34 of ramp 20 is submerged in a flooded cranberry bog as shown in FIG. 1. Flooding the bog and going over it with a beater causes the cranberries, together with a tremendous number of cranberry leaves and other trash to float on the surface of the bog flood. Motor 74 advances conveyor at a speed of approximately 60 feet per minute and rotates blower 68 at 700 r.p.m. The movement of conveyor 12 and rotation of vanes 40 draw the water on and the floating berries and trash onto the submerged portion of the upper run of the conveyor. The berries and trash are deposited on the conveyor in a single layer and carried by the conveyor up ramp 20 and across frame 16. The water falls back through the conveyor into the bog. The air blast caused by blower 68 blows the trash and some water droplets off the berries, allowing the berries alone to be transported by the conveyor to discharge end 30 of machine 10 and, thence, into a storage or shipping box.

The flow of berries onto conveyor 12 is facilitated by wiper 66 and baffle 56. The baffle 56 insures that the eddy currents caused by the rotation of sprockets 32 and vanes 40 and by the lower run of the conveyor entering the water near ramp foot 34 do not prevent water and berry flow onto the conveyor upper run. The wiper 66 increases the water flow, and hence, berry flow, onto the conveyor upper run by reducing the amount of water carried onto the upper run by vanes 40 and the conveyor itself.

The flat bottom portion 72 of the casing of blower 68 causes the air flow from outlet 70 to be uneven, the intensity of the portion of the air flow passing from the outlet through one area of upper run 11 being significantly greater than that of the air flow portions passing through other areas of run 11. The strongest air flow portion exists at, and thus passes through, the portions of run 11 and stack 71 nearest ramp 20, e.g., where the berries and trash are initially introduced into the flow. This sharp upward blast separates and lifts the trash and some of the berries from the conveyor and blows the trash up and out of the stack. The berries, which present less surface to the air flow, are retained in the stack and fall back onto the conveyor through the weaker air blast passing through the portions of the run 11 and stack 71 nearer discharge end 30.

Other embodiments within the scope of the following claims will occur to those skilled in the art.

What is claimed is:

1. A cranberry harvester having:
   an inclined ramp with a lower end adapted for submerging in a flooded cranberry bog;
   an endless open conveyor including an upper run portion above said ramp, a lower run portion below said ramp, and an intermediate portion extending around and engaging a conveyor support provided on the lower end of said ramp;
   a motor for advancing said conveyor to cause water and cranberries from said bog to flow onto said upper run portion;
   a baffle mounted adjacent said lower end portion of said ramp, and a wiper secured to said baffle and engaging said intermediate conveyor portion for increasin said flow onto said conveyor.

2. The combination of claim 1 wherein said conveyor comprises a plurality of longitudinally-spaced, transversely-extending rungs and said conveyor support comprises a rotatably mounted support member including a plurality of circumferentially-spaced, axially-extending vanes adapted for protruding through the spaces between adjacent rungs of said intermediate portion of said conveyor.

3. The combination of claim 1 wherein said baffle extends transversely the width of said ramp and has a first longitudinal edge portion adjacent said intermediate conveyor portion and a second longitudinal edge portion below said first longitudinal edge portion.

4. A cranberry harvester comprising, in combination:
   an endless open conveyor having an upper run portion;
   a blower mounted below said upper run and positioned for producing an air stream directed upwardly through said upper run portion; and,
   means mounted below said upper run for causing the intensity at said upper run portion of a first portion of said air stream passing through said upper run portion to be substantially greater than are the intensities at said upper run portion of other portions of said air stream passing through said upper run portion, said first portion being of sufficient intensity to lift cranberries upwardly from said conveyor and said other portions being of less intensity than said sufficient intensity.

5. The combination of claim 4 wherein said blower comprises a squirrel cage blower having an outer housing defining an air outlet, an inner rotatable squirrel cage and an air flow chamber between the periphery of said squirrel cage and said housing, the portion of said housing opposite said outlet being at a distance from the periphery of said squirrel cage that is less than the distance of housing portions intermediate said outlet and said opposite housing portion from said periphery, whereby to provide an air flow chamber portion of reduced cross-sectional area.

6. The combination of claim 4 including a motor for advancing said conveyor relative to and through said air stream and wherein said first air stream portion is adjacent the area at which said advancing conveyor enters said air stream.

7. The cranberry harvester of claim 4 including an inclined ramp having a lower end adapted for submerging in a flooded cranberry bog, supporting said upper run portion of said conveyor, an intermediate portion of said conveyor extending around and engaging a conveyor support provided on said lower end of said ramp, and a baffle mounted adjacent said lower end extending transversely the width of said ramp with a first longitudinal edge portion adjacent said intermediate conveyor portion and a second longitudinal edge portion spaced below said first longitudinal edge portion.

8. The harvester of claim 7 including a wiper secured to said baffle and engaging said intermediate conveyor portion.

9. The harvester of claim 8 wherein said blower comprises a squirrel cage blower having an outer housing defining an air outlet, an inner rotatable squirrel cage and an air flow chamber between the periphery of said squirrel cage and said housing, the portion of said housing opposite said outlet being at a distance from the periphery of said squirrel cage that is less than the distance of housing portions intermediate said outlet and said opposite housing portion from said periphery, whereby to provide an air flow chamber portion of reduced cross-sectional area and said first air stream portion is the portion of said air stream nearest said ramp.

References Cited
UNITED STATES PATENTS

| 814,918 | 3/1906 | Powers | 209—138 |
| 1,487,303 | 3/1924 | Wollman | 209—137 |
| 1,533,644 | 4/1925 | Gebbardt | 56—330 |
| 2,671,301 | 3/1954 | Harrison | 56—330 |
| 2,931,500 | 4/1960 | Andren et al. | 208—138 X |
| 3,107,475 | 10/1963 | Gustafson | 56—328 |
| 3,347,029 | 10/1967 | Grinwald | 56—9 |
| 3,429,438 | 2/1969 | Palmen et al. | 209—137 |

JAMES A. OLIFF, Primary Examiner

U.S. Cl. X.R.

56—330